(12) United States Patent
Amon et al.

(10) Patent No.: US 8,811,482 B2
(45) Date of Patent: Aug. 19, 2014

(54) METHOD AND DEVICE FOR ESTABLISHING A CODED OUTPUT VIDEO STREAM FROM AT LEAST TWO CODED INPUT VIDEO STREAMS AND USE OF THE DEVICE AND CODED INPUT VIDEO STREAM

(75) Inventors: Peter Amon, München (DE); Andreas Hutter, München (DE)

(73) Assignee: Siemens Aktiengesellschaft, Munich (DE)

( * ) Notice: Subject to any disclaimer, the term of this patent is extended or adjusted under 35 U.S.C. 154(b) by 705 days.

(21) Appl. No.: 12/734,165

(22) PCT Filed: Sep. 12, 2008

(86) PCT No.: PCT/EP2008/062115
§ 371 (c)(1),
(2), (4) Date: Apr. 15, 2010

(87) PCT Pub. No.: WO2009/049974
PCT Pub. Date: Apr. 23, 2009

(65) Prior Publication Data
US 2010/0254458 A1    Oct. 7, 2010

(30) Foreign Application Priority Data

Oct. 15, 2007 (DE) .......................... 10 2007 049 351

(51) Int. Cl.
*H04N 11/02* (2006.01)
*H04Q 11/00* (2006.01)
*H04N 7/15* (2006.01)
*H04N 7/14* (2006.01)
*G06F 15/16* (2006.01)
*H04N 7/26* (2006.01)
*H04M 3/56* (2006.01)

(52) U.S. Cl.
CPC ................. *H04N 7/152* (2013.01); *H04N 7/14* (2013.01); *G06F 15/16* (2013.01); *H04N 19/00212* (2013.01); *H04M 3/567* (2013.01); *H04N 19/00139* (2013.01)
USPC ... 375/240.13; 375/240; 375/220; 348/384.1; 348/385.1; 348/390.1; 370/260; 370/266; 370/270

(58) Field of Classification Search
None
See application file for complete search history.

(56) References Cited

U.S. PATENT DOCUMENTS

| 7,139,015 | B2 | 11/2006 | Eshkoli et al. |
| 7,245,660 | B2 | 7/2007 | Yona et al. |
| 7,593,032 | B2 | 9/2009 | Civanlar et al. |
| 2005/0008240 | A1 | 1/2005 | Banerji et al. |
| 2005/0157164 | A1 | 7/2005 | Eshkoli et al. |

(Continued)

FOREIGN PATENT DOCUMENTS

| CA | 2 615 459 | 1/2007 |
| EP | 1 560 434 A2 | 8/2005 |

(Continued)

OTHER PUBLICATIONS

"Advanced video coding for generic audiovisual services," Series H: Audiovisual and Multimedia Systems, Infrastructure of Audiovisual Services—Coding of Moving Video, ITU-T H.264, Mar. 2005, pp. 4-12, 36-51.

(Continued)

*Primary Examiner* — Joseph Ustaris
*Assistant Examiner* — William Adrovel
(74) *Attorney, Agent, or Firm* — Staas & Halsey LLP

(57) ABSTRACT

Second images coded in a coded output video stream are generated for the visual display of image contents of first images coded in multiple coded input video streams, such that first coded image data of the coded input video streams are copied into second coded image data of the coded output video stream.

20 Claims, 13 Drawing Sheets

(56) References Cited

U.S. PATENT DOCUMENTS

| | | |
|---|---|---|
| 2005/0231588 A1 | 10/2005 | Yang et al. |
| 2006/0146734 A1 | 7/2006 | Wenger et al. |
| 2007/0200923 A1 | 8/2007 | Eleftheriadis et al. |
| 2007/0263087 A1 | 11/2007 | Hong et al. |
| 2008/0158339 A1 | 7/2008 | Civanlar et al. |
| 2008/0239062 A1 | 10/2008 | Civanlar et al. |

FOREIGN PATENT DOCUMENTS

| | | |
|---|---|---|
| WO | 03/049418 A2 | 6/2003 |
| WO | 2007/076486 A2 | 7/2007 |
| WO | 2007/095640 A2 | 8/2007 |

OTHER PUBLICATIONS

"Advanced video coding for generic audiovisual services," Series H: Audiovisual and Multimedia Systems, Infrastructure of Audiovisual Services—Coding of Moving Video; ITU-T H.264, May 2003, pp. 1-269.

"Video coding for low bit rate communication", Series H: Audiovisual and Multimedia Systems, Infrastructure of Audiovisual Services—Coding of Moving Video, Jan. 2005, pp. 18, 19, 32-34, 85-88.

FIG 3A

| seq_parameter_set_rbsp() { | SPS11 | SPS12 | SPS2 | Comment |
|---|---|---|---|---|
| profile_idc | 66 | 66 | 66 | 66: baseline profile |
| constraint_set0_flag | 1 | 1 | 1 | 1: indicates baseline profile |
| constraint_set1_flag | 0 | 0 | 0 | 0: indicates no main profile |
| constraint_set2_flag | 0 | 0 | 0 | 0: indicates no extended profile |
| constraint_set3_flag | 1 | 1 | 0 | 1: indicates level 1b<br>0: indicates no level 1b |
| reserved_zero_4bits/* equal to 0*/ | 0 | 0 | 0 | fixed value |
| level_idc | 11 | 11 | 11 | level 1b for IN 1 and IN 2, level 1.1 for OUT |
| seq_parameter_set_id | 1 | 2 | 0 | new index for SPS |
| if(profile_idc ==80 \|\| profile_idc==81 \|\|<br>profile_idc ==82 \|\| profile_idc==83 \|\| ){ | | | | |
| chroma_format_idc | | | | not present in baseline profile |
| bit_depth_luma_minus8 | | | | not present in baseline profile |
| bit_depth_chroma_minus8 | | | | not present in baseline profile |
| lossless_qpprime_y_zero_flag | | | | not present in baseline profile |
| seq_scaling_matrix_present_flag | | | | not present in baseline profile |
| if(seq_scaling_matrix_present_flag){ | | | | |
| for(i=0; i<8; i++){ | | | | |
| seq_scaling_list_present_flag[i] | | | | not present |
| if(seq_scaling_list_present_flag[i]) | | | | |
| if(i<6) | | | | |
| scaling_list(ScalingList4x4[i], 16,<br>UseDefaultScalingMatrix4x4Flag[i]) | | | | not present |
| else | | | | |
| scaling_list(ScalingList8x8[i-6], 64,<br>UseDefaultScalingMatrix8x8Flag[i-6]) | | | | not present |
| } | | | | |
| } | | | | |
| } | | | | |

FIG 3B

| | | | | |
|---|---|---|---|---|
| log2_max_frame_num_minus4 | 3 | 4 | 4 | MaxFrameNum=128 or 256 |
| pic_order_cnt_type | 0 | 0 | 0 | |
| if(pic_order_cnt_type==0) | | | | |
|    log2_max_pic_order_cnt_lsb_minus4 | 1 | 1 | 1 | |
| else if(pic_order_cnt_type==1){ | | | | |
|    delta_pic_order_always_zero_flag | | | | not present |
|    offset_for_non_ref_pic | | | | not present |
|    offset_for_top_to_bottom_field | | | | not present |
|    num_ref_frames_in_pic_order_cnt_cycle | | | | not present |
|    for(i=0; i<num_ref_frames_in_pic_order_cnt_cycle; i++) | | | | |
|      offset_for_ref_frame[i] | | | | not present |
| } | | | | |
| num_ref_frames | 1 | 5 | 5 | |
| gaps_in_frame_num_value_allowed_flag | 0 | 0 | 0 | |
| pic_width_in_mbs_minus1 | 10 | 10 | 10 | width is 11 MBs |
| pic_height_in_map_units_minus1 | 8 | 8 | 17 | height is 9 or 18 MBs |
| frame_mbs_only_flag | 1 | 1 | 1 | 1: no interlace (fixed in baseline profile) |
| if(!frame_mbs_only_flag) | | | | |
|    mb_adaptive_frame_field_flag | | | | not present |
| direct_8x8_inference_flag | 1 | 1 | 1 | |
| frame_cropping_flag | 0 | 0 | 0 | 0: no "frame cropping" |
| if(frame_cropping_flag){ | | | | |
|    frame_crop_left_offset | | | | not present |
|    frame_crop_right_offset | | | | not present |
|    frame_crop_top_offset | | | | not present |
|    frame_crop_bottom_offset | | | | not present |
| } | | | | |
| vui_parameters_present_flag | 0 | 0 | 0 | |
| if(vui_parameters_present_flag) | | | | 0: no VUI parameters |
|    vui_parameters() | | | | not present |
| rbsp_trailing_bits() | | | | for byte alignment and to avoid start code emulation |
| } | | | | |

FIG 4A

| pic_parameter_set_rbsp(){ | PPS11 | PPS12 | PPS2 | Comment |
|---|---|---|---|---|
| pic_parameter_set_id | 2 | 3 | 0 | new index for PPS |
| seq_parameter_set_id | 1 | 2 | 0 | new reference for SPS |
| entropy_coding_mode_flag | 0 | 0 | 0 | 0: CAVLC |
| pic_order_present_flag | 0 | 0 | 0 | 0: picture arrangement with reference to syntax elements not present |
| num_slice_groups_minus1 | 0 | 0 | 0 | |
| if(num_slice_groups_minus1>0){ | | | | |
| slice_group_map_type | | | | |
| if(slice_group_map_type==0) | | | | |
| for(IGroup=0; IGroup<=num_slice_groups_minus1; IGroup++) | | | | |
| run_lenght_minus1[iGroup] | | | | not present |
| else if(slice_group_map_type==2) | | | | |
| for(iGroup=0; iGroup<num_slice_groups_minus1; iGroup++){ | | | | |
| top_left[iGroup] | | | | index of top left MB |
| bottom_right[iGroup] | | | | index of bottom right MB |
| } | | | | |
| else if(slice_group_map_type==3 \|\| slice_group_map_type==4 \|\| slice_group_map_type==5) { | | | | |
| slice_group_change_direction_flag | | | | not present |
| slice_group_change_rate_minus1 | | | | not present |
| }else if(slice_group_map_type==6){ | | | | |
| pic_size_in_map_units_minus1 | | | | not present |
| for(i=0; i<=pic_size_in_map_units_minus1; i++) | | | | |
| slice_group_id[i] | | | | not present |
| } | | | | |
| } | | | | |
| num_ref_idx_l0_active_minus1 | 5 | 10 | 10 | |
| num_ref_idx_l1_active_minus1 | | | | |

FIG 4B

| | | | | |
|---|---|---|---|---|
| weighted_pred_flag | 0 | 0 | 0 | fixed in baseline profile |
| weighted_bipred_idc | 0 | 0 | 0 | fixed in baseline profile |
| pic_init_qp_minus26 /* relative to 26*/ | 0 | 0 | 0 | |
| pic_init_qs_minus26 /* relative to 26*/ | 0 | 0 | 0 | |
| chroma_qp_index_offset | 0 | 0 | 0 | |
| deblocking_filter_control_present_flag | 0 | 0 | 0 | |
| constrained_intra_pred_flag | 1 | 1 | 1 | |
| redundant_pic_cnt_present_flag | 0 | 0 | 0 | |
| if(more_data_in_rbsp()){ | | | | |
| if(entropy_coding_mode_flag) | | | | |
| transform_8x8_mode_flag | | | | not present in baseline profile |
| pic_scaling_matrix_present_flag | | | | not present in baseline profile |
| if(pic_scaling_matrix_present_flag){ | | | | |
| for(i=0; i<6+2* transform_8x8_mode_flag; i++){ | | | | |
| pic_scaling_list_present_flag[i] | | | | not present |
| if(pic_scaling_list_present_flag[i]) | | | | |
| if(i<6) | | | | |
| scaling_list(ScalingList4x4[i], 16, UseDefaultScalingMatrix4x4Flag[i]) | | | | not present |
| else | | | | |
| scaling_list(ScalingList8x8[i-6], 64, UseDefaultScalingMatrix8x8Flag[i-6]) | | | | not present |
| } | | | | |
| } | | | | |
| second_chroma_qp_index_offset | | | | not present in baseline profile |
| } | | | | |
| rbsp_trailing_bits() | | | | |
| } | | | | |

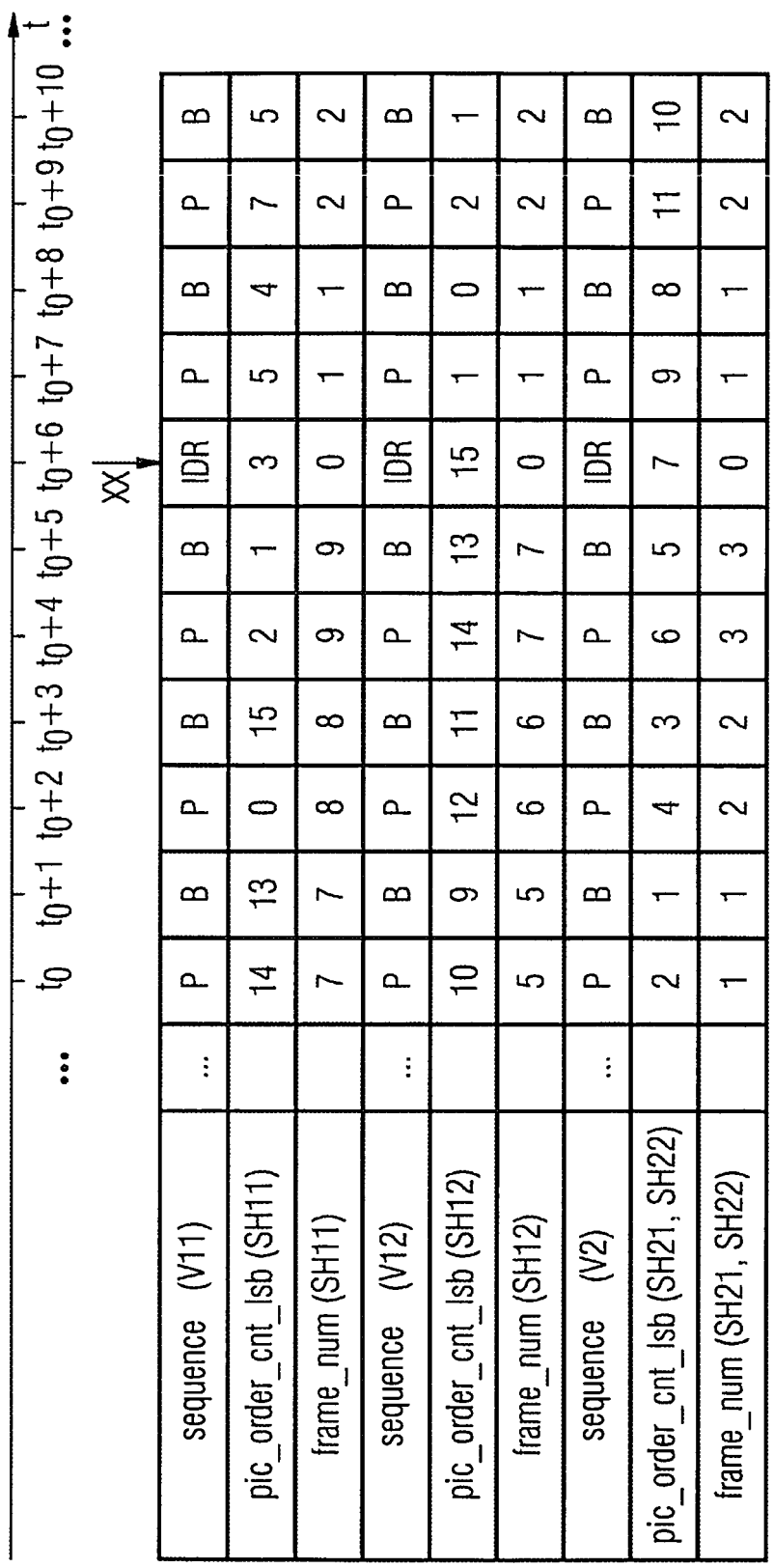

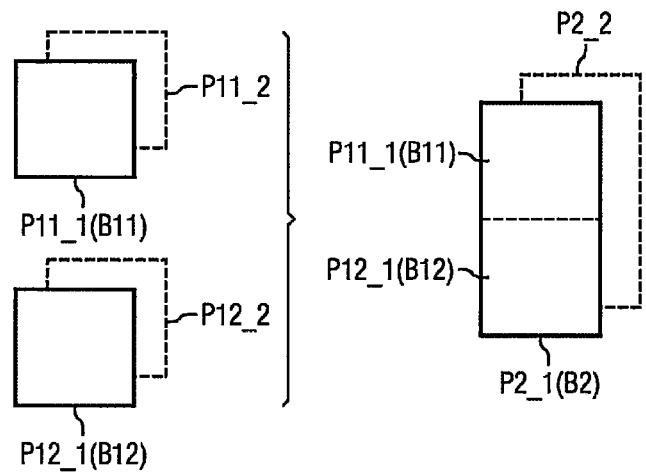
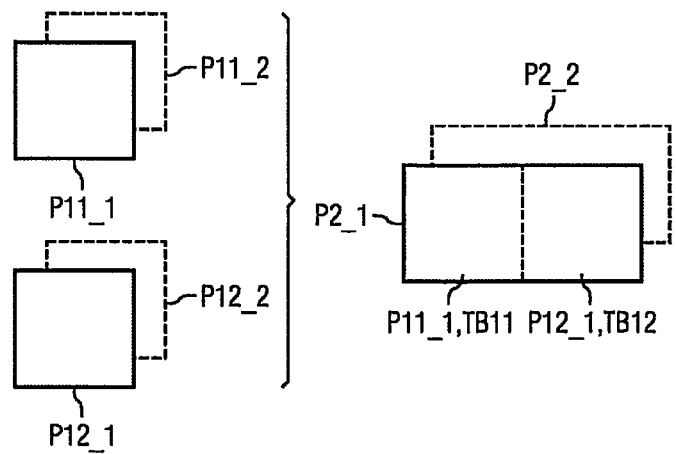

FIG 7A

| seq_parameter_set_rbsp() { | SPS11 | SPS12 | SPS2 | Comment |
|---|---|---|---|---|
| profile_idc | 66 | 66 | 66 | 66: baseline profile |
| constraint_set0_flag | 1 | 1 | 1 | 1: indicates baseline profile |
| constraint_set1_flag | 0 | 0 | 0 | 0: does not indicate main profile |
| constraint_set2_flag | 0 | 0 | 0 | 0: does not indicate extended profile |
| constraint_set3_flag | 1 | 1 | 0 | 1: indicates level 1b 0: does not indicate level 1b |
| reserved_zero_4bits/* equal to 0*/ | 0 | 0 | 0 | fixed value |
| level_idc | 11 | 11 | 11 | level 1b for IN 1 and IN 2, level 1.1 for OUT |
| seq_parameter_set_id | 1 | 2 | 0 | new index for SPS |
| if (profile_idc ==80 \|\| profile_idc==81 \|\| profile_idc ==82 \|\| profile_idc==83 \|\| ){ | | | | |
|   chroma_format_idc | | | | not present in baseline profile |
|   bit_depth_luma_minus8 | | | | not present in baseline profile |
|   bit_depth_chroma_minus8 | | | | not present in baseline profile |
|   lossless_qpprime_y_zero_flag | | | | not present in baseline profile |
|   seq_scaling_matrix_present_flag | | | | not present in baseline profile |
|   if(seq_scaling_matrix_present_flag){ | | | | |
|     for(i=0; i<8; i++){ | | | | |
|       seq_scaling_list_present_flag[i] | | | | not present |
|       if(seq_scaling_list_present_flag[i]) | | | | |
|         if(i<6) | | | | |
|           scaling_list(ScalingList4x4[i], 16, UseDefaultScalingMatrix4x4Flag[i]) | | | | not present |
|         else | | | | |
|           scaling_list(ScalingList8x8[i-6], 64, UseDefaultScalingMatrix8x8Flag[i-6]) | | | | not present |
|     } | | | | |
|   } | | | | |
| } | | | | |

FIG 7B

| | | | | |
|---|---|---|---|---|
| log2_max_frame_num_munus4 | 3 | 4 | 4 | MaxFrameNum=128 or 256. |
| pic_order_cnt_type | 0 | 0 | 0 | |
| if(pic_order_cnt_type==0) | | | | |
|     log2_max_pic_order_cnt_lsb_minus4 | 1 | 1 | 1 | |
| else if(pic_order_cnt_type==1){ | | | | |
|     delta_pic_order_always_zero_flag | | | | not present |
|     offset_for_non_ref_pic | | | | not present |
|     offset_for_top_to_bottom_field | | | | not present |
|     num_ref_frames_in_pic_order_cnt_cycle | | | | not present |
|     for(i=0; i<num_ref_frames_in_pic_order_cnt_cycle; i++) | | | | |
|         offset_for_ref_frame[i] | | | | not present |
| } | | | | |
| num_ref_frames | 1 | 5 | 5 | |
| gaps_in_frame_num_value_allowed_flag | 0 | 0 | 0 | |
| pic_width_in_mbs_minus1 | 10 | 10 | 21 | width is 11 or 22 MBs |
| pic_height_in_map_units_minus1 | 8 | 8 | 8 | height is 9 MBs |
| frame_mbs_only_flag | 1 | 1 | 1 | 1: no interlace (fixed in baseline profile) |
| if(!frame_mbs_only_flag) | | | | |
|     mb_adaptive_frame_field_flag | | | | not present |
| direct_8x8_inference_flag | 1 | 1 | 1 | |
| frame_cropping_flag | 0 | 0 | 0 | 0: no "frame cropping" |
| if(frame_cropping_flag){ | | | | |
|     frame_crop_left_offset | | | | not present |
|     frame_crop_right_offset | | | | not present |
|     frame_crop_top_offset | | | | not present |
|     frame_crop_bottom_offset | | | | not present |
| } | | | | |
| vui_parameters_present_flag | 0 | 0 | 0 | |
| if(vui_parameters_present_flag) | | | | 0: no VUI parameters |
|     vui_parameters() | | | | not present |
| rbsp_trailing_bits() | | | | for byte alignment and to avoid start code emulation |
| } | | | | |

FIG 8A

| pic_parameter_set_rbsp() | PPS11 | PPS12 | PPS2 | Comment |
|---|---|---|---|---|
| pic_parameter_set_id | 2 | 3 | 0 | new index for PPS |
| seq_parameter_set_id | 1 | 2 | 0 | new reference for SPS |
| entropy_coding_mode_flag | 0 | 0 | 0 | 0: CAVLC |
| pic_order_present_flag | 0 | 0 | 0 | 0: picture arrangement with reference to syntax elements not present |
| num_slice_groups_minus1 | 0 | 0 | 1 | |
| if(num_slice_groups_minus1>0){ | | | | |
| slice_group_map_type | | | 2 | |
| if(slice_group_map_type==0) | | | | |
| for(iGroup=0; iGroup<=num_slice_groups_minus1; iGroup++) | | | | |
| run_lenght_minus1[iGroup] | | | | not present |
| else if(slice_group_map_type==2) | | | | |
| for(iGroup=0; iGroup<num_slice_groups_minus1; iGroup++){ | | | | |
| top_left[iGroup] | | | | index of top left MB |
| bottom_right[iGroup] | | | | index of bottom right MB |
| } | | | | |
| else if(slice_group_map_type==3 \|\| slice_group_map_type==4 \|\| slice_group_map_type==5) { | | | | |
| slice_group_change_direction_flag | | | | not present |
| slice_group_change_rate_minus1 | | | | not present |
| }else if(slice_group_map_type==6){ | | | | |
| pic_size_in_map_units_minus1 | | | | not present |
| for(i=0; i<=pic_size_in_map_units_minus1; i++) | | | | |
| slice_group_id[i] | | | | not present |
| } | | | | |
| } | | | | |
| num_ref_idx_l0_active_minus1 | 5 | 10 | 10 | |
| num_ref_idx_l1_active_minus1 | | | | |

FIG 8B

| | | | | |
|---|---|---|---|---|
| weighted_pred_flag | 0 | 0 | 0 | fixed in baseline profile |
| weighted_bipred_idc | 0 | 0 | 0 | fixed in baseline profile |
| pic_init_qp_minus26 /* relative to 26*/ | 0 | 0 | 0 | |
| pic_init_qs_minus26 /* relative to 26*/ | 0 | 0 | 0 | |
| chroma_qp_index_offset | 0 | 0 | 0 | |
| deblocking_filter_control_present_flag | 0 | 0 | 0 | |
| constrained_intra_pred_flag | 1 | 1 | 1 | |
| redundant_pic_cnt_present_flag | 0 | 0 | 0 | |
| if(more_data_in_rbsp()){ | | | | |
| if(entropy_coding_mode_flag) | | | | |
| transform_8x8_mode_flag | | | | not present in baseline profile |
| pic_scaling_matrix_present_flag | | | | not present in baseline profile |
| if(pic_scaling_matrix_present_flag){ | | | | |
| for(i=0; i<6+2* transform_8x8_mode_flag; | | | | |
| pic_scaling_list_present_flag[i] | | | | not present |
| if(pic_scaling_list_present_flag[i]) | | | | |
| if(i<6) | | | | |
| scaling_list(ScalingList4x4[i], 16, UseDefaultScalingMatrix4x4Flag[i]) | | | | not present |
| else | | | | |
| scaling_list(ScalingList8x8[i-6], 64, UseDefaultScalingMatrix8x8Flag[i-6]) | | | | not present |
| } | | | | |
| } | | | | |
| second_chroma_qp_index_offset | | | | not present in baseline profile |
| } | | | | |
| rbsp_trailing_bits() | | | | |
| } | | | | |

METHOD AND DEVICE FOR ESTABLISHING A CODED OUTPUT VIDEO STREAM FROM AT LEAST TWO CODED INPUT VIDEO STREAMS AND USE OF THE DEVICE AND CODED INPUT VIDEO STREAM

CROSS REFERENCE TO RELATED APPLICATIONS

This application is the U.S. national stage of International Application No. PCT/EP2008/062115, filed Sep. 12, 2008 and claims the benefit thereof. The International Application claims the benefits of German Application No. 10 2007 049 351.9 filed on Oct. 15, 2007, both applications are incorporated by reference herein in their entirety.

BACKGROUND

Described below is a method and device for establishing a coded output video stream from at least two coded input video streams, for joint representation of a first picture of each of the coded input video streams in a second picture of the coded output video stream. Also described are a use of the device and a coded input video stream.

In recent years, video-based applications, e.g. for monitoring systems or in the context of video conferences, have increased. Often, the intention is that multiple video streams should be displayed on one terminal simultaneously. In a video conference with more than two participants, not just one of the participants will be visible at an instant, as is the case, for example, if "Voice Activated Switching" technology is used, but instead two or all interlocutors are shown simultaneously on the appropriate terminal. This is called "Continuous Presence". In a further example from the field of video monitoring, the intention is that multiple video streams should be shown simultaneously on one control monitor. If the monitoring system in the control room has only one video decoder, only one of the monitoring videos can be decoded and displayed at one instant.

To implement "Continuous Presence", several solutions are already known. A first solution uses multiple video decoders in the terminals, by which two or more video streams received in parallel can be decoded and displayed. This solution shows the disadvantages, that on the one hand implementation of multiple video decoders in one terminal is cost-intensive, and on the other hand many video conferencing terminals which have only one video decoder are in use.

A second known solution is use of a video bridge or video conference control unit, also known as a Multipoint Conference Unit (MCU). This video bridge represents a central unit, which first receives the coded video streams of all participants of the video conference, and generates a dedicated coded video stream for each participant. For this purpose, the received video streams are completely decoded, and then combined and newly coded according to the requirements of the interlocutors. This transcoding is very complex, and is often implemented in hardware, resulting in high device costs. The transcoding also causes delays because of multiple signal processing steps. Finally, the transcoding results in reduced quality of the newly generated video stream.

In a standard, ITU H.263 Annex C, a further solution is given. In this case, multiple independent H.263-coded video streams are written into one video stream. The procedure according to the related art is explained in more detail using FIG. 1.

FIG. 1 shows two H.263-coded bit streams BS1 and BS2. They are multiplexed using a video multiplexing unit VME in the H.263D data stream. So that a video decoder which conforms to H.263 can detect that there are two sub-bitstreams in the data stream, the so-called CPM (Continuous Presence Multipoint) flag is set. This CPM flag is in the "Picture Header" of each coded picture. In the case of coded H.263 video streams with only one video stream, such as the coded video streams BS1 and BS2, the CPM flag=0. If multiple H.263 video streams are multiplexed, the CPM flag is set to CPM=1, and a control parameter PSBI (Picture Sub-Bitstream Indicator) is set as an index to identify the appropriate sub-bitstream. The H.263 standard allows a maximum of four sub-bitstreams. In FIG. 1, it can be seen that the sub-bitstream of the coded video stream BS1 in the H.263D video stream is indicated by PSBI=0, and that of the coded video stream BS2 by PSBI=1.

Similar indications are also found at GOB (Group of Block) level by a control parameter GSBI (GOB Sub-Bitstream Indicator), or at slice level by a control parameter SSBI (Slice Sub-Bitstream Indicator). Thus even finer multiplexing of the sub-bitstreams is possible. Also, the end of a sub-bitstream within the H.263D data stream is indicated by a further control parameter ESBI (Ending Sub-Bitstream Indicator).

The presented multiplexing method of the H.263 Annex C standard only multiplexes two or more H.263-coded video streams into one data stream. This means that to show two or more of these coded video streams, two or more independent video decoders are required. Since implementation of the H.263 Annex C standard results in high complexity and thus high costs, e.g. implementation of independent video decoders with their own picture memories, this Annex C is rarely implemented in terminals.

SUMMARY

The method and device may be used with coded picture data of at least two coded input video streams so that they can be transformed into a single coded output video stream, without the necessity of transcoding the coded picture data, and simultaneously a data volume of the generated coded output video stream can be kept small.

The method establishes a coded output video stream from at least two coded input video streams, for joint representation of a first picture of each of the coded input video streams in a second picture of the coded output video stream, wherein
  the coded input video streams each include first coded picture data and first signaling data, the first coded picture data in each case having picture information coded for the first picture;
  the coded output video stream and the coded input video streams have an identical color format, an identical bit resolution per coded pixel and an identical picture scanning, and are coded using an identical video coding method;
  the video coding method has at least one coding mode wherein the second coded picture data—which describes the second picture—of the coded output video stream can be divided into separable coded sub-picture data;
  the coded output video stream, with second control data and the second coded picture data, is established in such a way that
  the second coded picture data is generated by copying one of the first coded picture data of first pictures to be shown simultaneously into one of the coded sub-picture data TB1=B11, TB2=B12 of the second picture;

the second signaling data (S2) is generated at least partly on the basis of the first signaling data.

The method has the advantages that to establish the coded output video stream, the first coded picture data of the coded input video streams can be taken over, without transcoding, by direct copying, which saves time and computational complexity. Additionally, a data volume of the coded output video stream is small compared with multiplexing whole coded input video streams, since the second signaling data has a considerably smaller data volume than a sum of the first signaling data of all coded input video streams. What is also achieved by copying the first picture data into the second picture data is that a picture quality loss which would otherwise result from transcoding is avoided. Finally, generation of the coded output video stream can be controlled in such a way that by adding more or fewer coded input video streams, a data rate of the coded output video stream of available transmission bandwidths can be individually and dynamically adapted.

In this context, first and second coded picture data are understood to be information which includes picture information in compressed form, e.g. movement vectors and transformed, quantized and entropy-coded picture and differential picture information. First and second signaling data are understood as that information of the relevant coded input video streams or output video stream which includes administrative information such as picture size, picture number or quantization parameters.

The first signaling data may be represented by first signaling parameters and the second signaling data is represented by second signaling parameters, and corresponding first signaling parameters of the appropriate coded input video streams are analyzed for whether they have an identical parameter value, and for the case that corresponding first signaling parameters have the identical parameter value, the identical parameter value is assigned to the second signaling parameter corresponding to the analyzed first signaling parameters.

What is advantageously achieved by this procedure is that all second signaling data does not have to be newly calculated, but at least part of it can be generated directly by copying from the first signaling data. This reduces the required time and computational complexity to establish the output video stream.

In a development of the method, the coded input video streams each have multiple first pictures, and the coded output video stream is established by generating, in each case, the second signaling data and second coded picture data for a picture pair of the coded input video streams, on the basis of first picture data and first signaling data.

It is thus made possible to generate, advantageously, picture sequences of the coded output video stream from picture sequences of the coded input video streams.

In a development, for a second picture, where the coded sub-picture data are arranged one above the other, second signaling parameters of the second signaling data are generated for the coded sub-picture data which is arranged at the bottom, in such a way that an address of a first picture block, in particular a macroblock at top left, of the coded sub-picture data which is arranged at the bottom is generated from an address, which is higher by a value one, of a last picture block, in particular of a macroblock at bottom left or right, of the coded sub-picture data which is arranged at the top. In this way, it becomes possible, in a specially simple way, to establish two first picture information items, which are present as first coded picture data, in the coded output video stream.

In a development of the method, in each case a first signaling parameter, which describes an offset of a quantization parameter in the first signaling data, is analyzed, and if at least two of the analyzed first signaling parameters are different, a difference value of the analyzed first signaling parameters is determined, and the difference value is inserted as a further signaling parameter into a second signaling parameter of the second signaling data, the inserted signaling parameter being assigned to that coded sub-picture data in which addition of the analyzed signaling parameter into the first signaling data corresponds to the difference value of one of the other analyzed first signaling parameters.

This development makes it possible to use even first coded picture data which has different offsets of the relevant quantization parameter within the method.

If a first signaling parameter, which describes a maximum number of reference pictures to be taken into account in the coded input stream, is analyzed in the first signaling data, the signaling parameter from the analyzed first signaling parameters which has a highest parameter value is selected, and the selected signaling parameter is inserted into the second signaling data, and thus even coded input video streams having a different maximum number of reference pictures to be taken into account can be used within the method.

In a development, a first signaling parameter, which describes an explicit or implicit control of a deblocking filter, is analyzed in the first signaling data, and if both explicit and implicit control are indicated by the analysis result, the explicit signaling is inserted into the second signaling data belonging to the coded sub-picture data as signaling parameters. This procedure allows the use even of coded input video streams which provide different control of the deblocking filter.

To establish the second coded picture data for the second picture, in each case a first picture of the coded input video streams may be selected, in such a way that the first coded picture data belonging to the first pictures is present in an identical prediction mode, in particular INTER coding, INTRA coding or bidirectional coding. In this way, the second signaling data can be generated specially efficiently and simply.

In a development, as the coding mode of the video coding method, a slice mode is chosen, and each slice is assigned to one of the coded sub-picture data by the slice mode. This procedure makes simple assignment of the first coded picture data to second coded picture data possible.

In a development, as the coding mode of the video coding method, a slice group mode is chosen, and each slice group is assigned to one of the coded sub-picture data by the slice group mode. Thus for the second coded picture data, a coding mode which permits a flexible arrangement, in the second picture, of a representation of the first pictures described by the sub-picture data is used. As the video coding method, a standard, ITU H.264, in which a slice group mode is used to form the coded sub-picture data, can be used.

In general, one of the standards ITU H.264, ITU H.263 or SVC can be used as the coding method, so that inexpensive use of the method in the near term is achieved, since the above-mentioned video coding standards are widely used.

The coded input video streams may be generated by extraction of Base Layer Information from SVC-coded input streams. This has the advantage that even coded input streams of a different video coding standard from the coded output video stream can be used within this method.

If the coded input video streams are generated from SVC-coded input streams on the basis of a Base Layer Information and at least one Enhancement Layer Information, the extracted Base and Enhancement Layer Information having an identical structure of the local and SNR layers, the coded input video streams can be generated from SVC-coded input streams, depending on specifiable conditions such as available bandwidths or required picture qualities.

In a development, to establish the coded output video stream, one or more of the coded input video streams, which each have a signaling parameter indicating that a prediction for coding the first picture exclusively within a picture border of the first picture has been carried out, are used. This has the advantage that picture quality disturbances because of wrong decoding decisions at a picture edge can be avoided. In this case, the signaling parameter can be generated in the following form, in particular using an SEI message according to video coding standard H.264:

mixing_info (payloadSize) {constraint_inter_pred_flag} where the "paylaodSize" field describes a size of the SEI message, and a specifiable value of the "constraint_inter_pred_flag" field indicates that a prediction for coding the first picture exclusively within a picture border of the first picture has been carried out. This SEI (Supplemental Enhancement Information) message can signal the development, while conforming to the standard.

The device is used in establishing a coded output video stream from at least two coded input video streams, for joint representation of a first picture of each of the coded input video streams in a second picture of the coded output video stream, the device including components by which at least one part of the above method can be carried out. The device makes it possible to implement and execute the method.

Additionally, the device may be used in a video conference control unit to connect at least two terminals.

Finally, the coded input video stream for use in a method according to the above method or device is used to establish the coded output video stream being generated in such a way that it has a signaling parameter indicating that a prediction for coding a first picture exclusively within a picture border of the first picture is carried out.

BRIEF DESCRIPTION OF THE DRAWINGS

These and other aspects and advantages will become more apparent and more readily appreciated from the following description of the exemplary embodiments, taken in conjunction with the accompanying drawings of which:

FIGS. 3A and 3B are a table for an exemplary second sequence parameter set for the exemplary embodiment according to FIG. 2;

FIGS. 4A and 4B are a table for an exemplary second picture parameter set for the exemplary embodiment according to FIG. 2;

FIG. 5 is a timeline and a table providing an overview of picture numbers for an adaptation of the reproduction and decoding sequence;

FIG. 6 is a block diagram of a vertical arrangement of coded sub-picture data by "slice mode" after a decoding;

FIGS. 7A and 7B are a table for an exemplary second sequence parameter set for an exemplary embodiment if a "slice group mode" is used;

FIGS. 8A and 8B are a table for an exemplary second picture parameter set for an exemplary embodiment if a "slice group mode" is used;

FIG. 9 is a block diagram of a horizontal arrangement of coded sub-picture data by "slice group mode" after decoding;

DETAILED DESCRIPTION OF THE PREFERRED EMBODIMENT

Figure 1:
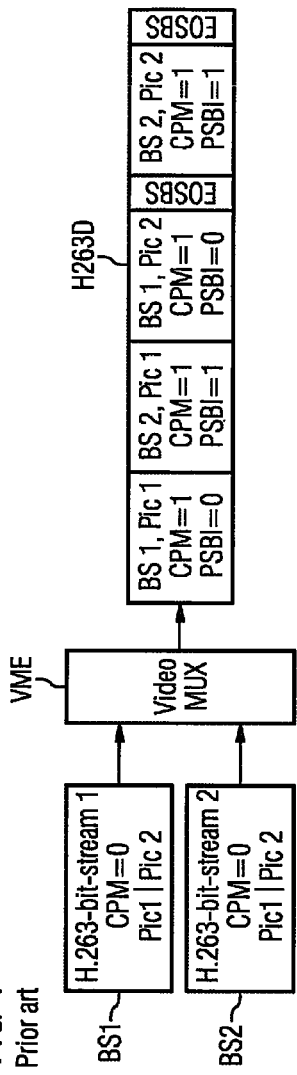
FIG. 1 is a block diagram illustrating a use of sub-bitstreams with an H.264 263 Annex C standard.

Reference will now be made in detail to the preferred embodiments, examples of which are illustrated in the accompanying drawings, wherein like reference numerals refer to like elements throughout.

Described below are several exemplary embodiments based on video coding methods and video coding standards which are current today.

A picture taken by a camera, e.g. in YUV422 format, includes multiple pixels. In the video coding methods which are current today, the pixels are combined into blocks, e.g. with 4×4 or 16×16 pixels, and encoded or compressed. Such picture blocks are also known by the name macroblocks. For coding, the relevant picture block is subjected to INTRA coding or INTER coding. In INTRA coding, the picture block is coded without the aid of previously coded picture information. For example, the picture block is subjected to a two-dimensional discrete cosine transformation (DCT), the resulting coefficients are quantized, and the quantized coefficients are processed further by entropy coding, e.g. Huffman coding. In the case of INTER coding, the coding is based on previously coded picture blocks, e.g. in a picture which precedes or follows the picture which is currently to be coded, and/or previously coded picture information within the picture which is currently to be coded. In the case of INTER coding, first a prediction vector or prediction mode is determined by a movement estimation or other prediction rule. On the basis of the determined prediction vector or prediction mode, the result is a prediction signal, which is subtracted from the picture signal of the picture block which is currently to be coded, resulting in a residual error signal. This residual error signal is subjected, similarly to the INTRA coding, to a transformation, a quantization and finally an entropy coding, e.g. an arithmetic coding. Thus coded picture data is described by compressed coefficients, and if required by used prediction vectors and/or prediction modes, when INTER coding is used.

Figure 2:
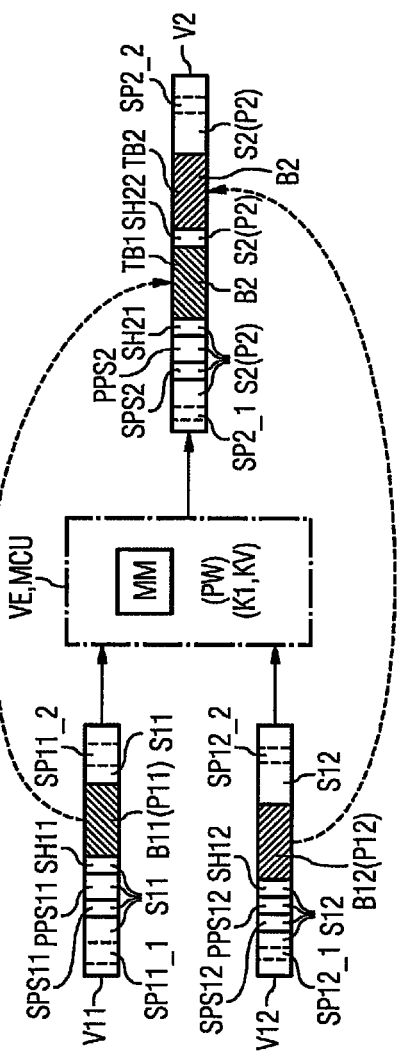
FIG. 2 is a schematic arrangement for an exemplary embodiment when a "slice mode" coding mode is used.

In FIG. 2, the coded picture data is shown symbolically, as first coded picture data B11, B12 of the appropriate coded input video stream V11, V12, and as second coded picture data B2 of a coded output video stream V2. To generate a video stream according to a video coding method or standard, signaling data, which supplies administrative information to a decoder, e.g. a picture size or a picture number of the coded picture, must be given, in addition to the coded picture data. This required signaling data is called first signaling data S11 and S12 respectively in the coded input video streams V11, V12, and second signaling data S2 in the coded output video stream V2.

In this exemplary embodiment according to FIG. 2, the first coded picture data B11, B12 of the coded input video streams V11, V12 are to be mixed into a single coded output video stream V2, in such a way that a simultaneous representation of both first pictures P11, P12 which are represented by the first coded picture data can be reproduced using a single decoder. This corresponds to the "Continuous Presence" mode, which was mentioned in the introduction. In FIG. 2, as examples, the coded input video streams V11, V12, coded using a video coding standard ITU H.264, are shown. In the H.264 standard, picture information to be coded is represented using "slices". A slice includes a slice header, e.g. the first slice header SH11, SH12, and the actual coded picture data, see the first coded picture data B11, B12. In FIG. 2, the first and second signaling data S11, S12, S2 are represented symbolically by unfilled rectangles. In general, the signaling data includes one or more signaling parameters. In this exemplary embodiment according to FIG. 2, the first signaling data S11, S12 includes, among other things, first sequence parameter sets SPS11, SPS12, first picture parameter sets PPS11, PPS12 and the first slice headers SH11, SH12.

The coded output video stream V2 to be established has, in addition to second coded picture data B2 for the second picture P2, second signaling data S2. This second signaling data S2 includes, among other things, second slice headers SH21, SH22, a second sequence parameter set SPS2 and a second picture parameter set PPS2.

To establish the coded output video stream V2, the following two steps are carried out:

First Step:

The second coded picture data B2 is generated in such a way that in the coded output video stream, two slices TB1, TB2 are provided, the first coded picture data B11 of the one coded input video stream V11 being copied into the one slice TB1, and the first coded picture data B12 of the other coded input video stream V12 being copied into the other slice TB2. In this exemplary embodiment, the slices of the coded output video stream correspond to the coded sub-picture data TB1, TB2. By using these slices TB1, TB2, the property of separably coded sub-picture data is achievable, since the slices can be coded separately from each other and on decoding are shown simultaneously.

Second Step:

Here the second signaling data S2 is generated at least partly on the basis of the first signaling data S11, S12. Establishing the second signaling data, e.g. the second sequence parameter set SPS2, the second picture parameter set PPS2 and the second slice header SH21, SH22, is discussed in more detail below.

Generating the second slice header SH21, SH22:

If there is a restriction that all slices TB1, TB2 used in a picture have the same slice type, a corresponding field within the second slice header must be identical. The slices within a picture need not have the same slice type. Slice types 5 to 9 in H.264 signal that the same slice type appears in the whole picture. If two first picture data are to be mixed, this signaling can suddenly no longer be true. Then slice types 0 to 4 must be used. The mapping results from subtracting 5, or by a modulo 5 operation, from the corresponding signaling parameters of the first slice header.

Picture numbers, known as "pic_order_cnt_lab" signaling parameters in H.264, for the two slices TB1 and TB2, which are shown within the second picture, must be identical. This is achieved by choosing an identical picture number in the second slice headers. A specific procedure for this purpose is explained in more detail later.

A signaling parameter "frame_num" must be adapted on the basis of the corresponding entries in the appropriate slice headers SH11, SH12. A specific procedure for this purpose is explained in more detail later.

A signaling parameter which contains an address of a first macroblock in the slice TB2, which is shown in a bottom half of the second picture, must be adapted so that the address of this first macroblock is adjacent to an address of a last macroblock of the slice TB1 which is arranged at the top of the second picture.

For an example of this, see FIG. 6. For example, if the slice TB1 includes 99 macroblocks, i.e. macroblock numbers 0, . . . , 98, the address of the first macroblock of the second slice TB2 is 99. This is shown in the second picture P2 of FIG. 6, with numbers.

Accordingly, the corresponding signaling parameter (macroblock address field) is set to 99 in the second slice header SH22, which belongs to the slice TB2.

Further signaling parameters of the second slice header SH21 can be copied from the first slice header SH11, and for the second slice header SH22 from the first slice header SH12. Generating the second sequence parameter set SPS2, see FIGS. 3A and 3B:

A statement of the signaling parameter "profile_idc" of the second sequence parameter set SPS2 must be chosen so that all tools of the H.264 standard which are supported in the coded input video streams are supported. If the signaling parameters "profile_idc" in the first picture parameter sets PPS11, PPS12 are identical, this entry can be copied directly into the corresponding field of the second picture parameter set PPS2. In FIG. 3A, profile_idc=66.

A signaling parameter "level_idc" of the second picture parameter set PPS2 must be chosen so that the resulting parameters because of a new picture size, given by the second coded picture data, i.e. by the two slices TB1, TB2, e.g. a maximum number of macroblocks per picture, in this example, for instance, 2×99=198 macroblocks, are within the "level_idc" signaling parameter, which is to be newly defined. In FIG. 3A, level_idc=11.

Signaling parameters for color format "chroma_format_idc" and bit resolution of the pixels "bit_depth_luma_minus8" and "bit_depth_chroma_minus8" of the second signaling data can be copied directly from the corresponding signaling parameters of one of the first sequence parameter sets SPS11, since the color format and bit resolution in the coded input video streams and in the coded output video stream must be identical.

A calculation rule of a signaling parameter "pic_order_cnt_type" can either be copied directly from the corresponding signaling parameters of one of the first sequence parameter sets SPS11, SPS12, if this signaling parameter is equal in all first sequence parameter sets SPS11 and SPS12. Or, a value of this signaling parameter must be taken from one of the first sequence parameter sets SPS11, SPS12, in which case an adaptation of the picture numbers within the appropriate second slice header SH21, SH22 to the copied value must be adapted.

Additionally, a number of reference pictures in the coded output video stream, represented by a signaling parameter "num_ref_frames", of the second signaling data must be chosen so that it is chosen to be at least as great as a greatest value of a corresponding signaling parameter of the first signaling data. According to the example in FIG. 3B, the result for this signaling parameter for the second signaling data is:
num_ref_frames (SPS11)=1;
num_ref_frames (SPS12)=5
→num_ref_frames (SPS2)=5

As first signaling parameters, SPS11_1=num_ref_frames (SPS11) and SPS12_1=num_ref_frames (SPS12) should be understood, and as second signaling parameter, S2_1=num_ref_frames (SP2) should be understood.

A signaling parameter for the picture height "pic_width_in_mbs_minus1", and/or a further signaling parameter "pic_height_in_map_units_minus1" for a picture width of a picture size including the two slices TB1, TB2 must be adapted according to an arrangement of the slices. In this example, the first slice TB1 includes a picture format QCIF (Quarter Common Intermediate Format) of 11×9 macroblocks, and the second slice TB2 also includes 11×9 macroblocks. Since the two slices are shown in the second picture one beneath the other, the picture size is 11×(9+9)=11×18 macroblocks. Thus the signaling parameter "pic_width_in_mbs_−1"=11−1=10, and the further signaling parameter "pic_height_in_map_units_−1"=18−1=17.

Since a picture scanning which is used, i.e. progressive or interlaced, must be identical in the coded input video streams and in the coded output video stream, a signaling parameter "frame_mbs_only_flag" which describes the picture scanning can be taken from one of the first sequence parameter sets SPS12 and copied to the second sequence parameter sets SPS2.

When establishing the second picture parameter set PPS2, the following points must be taken into account, see FIGS. 4A and 4B for an exemplary embodiment:

In the second picture parameter set PPS2, new indices for the signaling parameters "pic_parameter_set_id" and "seq_parameter_set_id" are assigned. "seq_parameter_set_id" must be adapted to the chosen value in the second sequence parameter set SPS2. In FIG. 4A, the above-mentioned signaling parameters of the first picture parameter sets PPS11, PPS12 are not copied, but newly set in the second picture parameter set PPS2, so that pic_parameter_set_id (PPS2)=0 and seq_parameter_set_id=0.

A signaling parameter for a method of an applied entropy coding, see the "entropy_coding_mode_flag" signaling parameter, can be copied from the corresponding signaling parameter of one of the first picture parameter sets PPS11, PPS12, since this signaling parameter is identical in the coded input video streams and in the coded output video stream. Thus entropy_coding_mode_flag (PPS2)=entropy_coding_mode_flag (PPS11).

A signaling parameter of the second picture parameter set to give a maximum index for reference pictures in the coded output video stream, i.e. according to FIG. 4A "num_ref_idx_10_active_minus1" and/or "num_ref_idx_11_active_minus1", must be chosen to be at least as great as the greatest value of a signaling parameter of the coded input video streams which are used, corresponding to the named signaling parameter. According to the example of FIG. 4A, this signaling parameter in the first picture parameter set PPS11=5, and in PPS12=10. Thus num_ref_idx_10_active_minus1 (PPS2)=10 is entered into the second picture parameter set as the value of this signaling parameter.

If weighted prediction is used, associated signaling parameters "weighted_pred_flag" and "weighted_bipred_idc" can be identical in the first picture parameter sets, so that the corresponding signaling parameter of the second picture parameter set is set equal to the appropriate signaling parameter of one of the first picture parameter sets, e.g. weighted_pred_flag (PPS)=weighted_pred_flag (PPS11) and weighted_bipred_idc (PPS2)=weighted_bipred_idc (PPS12). However, if the signaling parameters in the first picture parameter sets are different, weighted prediction is signaled in the above-mentioned signaling parameters of the second picture parameter set. Then, in the second slice headers SH21, SH22, the weight which is used for the prediction in the associated slices TB1, TB2 is signaled, even if it corresponds to a default value, e.g. 1 for unidirectional and 0.5 for bidirectional prediction. These weights are written into so-called prediction weight tables in the appropriate second slice header.

If a signaling parameter for an offset for the quantization parameter, i.e. "pic_init_qp_minus26" or "pic_init_qs_minus26", is identical in the relevant first picture parameter sets PPS11, PPS12, the signaling parameter of one of the first picture parameter sets can be copied directly into the corresponding signaling parameter of the second picture parameter set. However, if these signaling parameters of the first picture parameter set are different, first the signaling parameter of one of the first picture parameter sets PPS11 is entered into the corresponding signaling parameters of the second picture parameter sets. Then a difference value between the entered signaling parameter and the corresponding signaling parameter SPX of the first picture parameter set is determined. Finally, this difference value is added to a quantization parameter "slice_QP_delta" of the second slice header which belongs to the slice which relates to the coded input video stream of the first picture parameter set of the corresponding signaling parameter SPX under consideration.

If a signaling parameter for the use of an explicit control of a deblocking filter, see "deblocking_filter_control_present_flag" in FIG. 4B, is identical in the first picture parameter sets, for the corresponding signaling parameter in the second picture parameter set a corresponding value from one of the first picture parameter sets can be copied. However, if this signaling parameter differs in the first picture parameter sets, this signaling parameter in the second picture parameter set must be set to explicit control of the deblocking filter.

In FIGS. 3A and 3B, exemplary signaling parameters are given for the first sequence parameter sets and the second sequence parameter set, and it can be seen in FIGS. 3A and 3B how a transformation of the signaling parameters of the first sequence parameter sets into the second sequence parameter set is possible. In FIGS. 4A and 4B, for the signaling parameters of the first picture parameter set, how they can be transformed into the corresponding signaling parameters of the second picture parameter set is indicated.

The H.264 video coding standard uses the counters "pic_order_cnt_lsb" and "frame_num" as signaling parameters in the slice headers. The counter "pic_order_cnt_lsb" is used to determine an output sequence of decoded pictures or slices, since a decoding sequence of individual pictures or slices can be different from the associated output sequence, i.e. reproduction on a screen. The other counter, "frame_num", is used to indicate reference pictures, and is used, among other things, to detect missing reference pictures, e.g. because of a transmission containing error(s). If a picture or slice is not a reference picture, the other counter "frame_num" is also not incremented.

FIG. 5 shows an example of adapting the picture numbers in the form of two counters "pic_order_cnt_lsb" and "frame_num" in the second slice headers SH21, SH22. Also, pictures/slices of the coded input video streams and coded output video stream are plotted over the time t, only a section starting at t0+0 and ending at t0+10 being considered. In the first line, a time sequence of successive coded pictures of the coded input video stream V11 can be seen. The coded picture information is marked as INTRA coding IDR, as INTER coding P, or as bidirectional coding B. In the second and third lines, the control parameters "pic_order_cnt" and "frame_num" from the first slice header SH11 of the coded input video stream V11 according to a rule of the H.264 video coding standard which is used are printed. Similarly, in lines 4 to 6, there is the corresponding data for coded picture information or pictures/slices of the coded input video stream V12. The coded pictures/slices given in a first and fourth line should be combined according to their arrangement in the appropriate column for the coded output video stream. For example, the IDR picture of the coded input video stream V11 and the IDR picture of the coded input video stream V12 of column XX should be transformed into an IDR picture of the coded output video stream. As can be seen in this column XX, the signaling parameters belonging to the coded input video stream in each case differ. They are newly established according to an exemplary proposal of lines 7 to 9, as follows:

A sequence, see FIG. 5 lines 1, 4, 7, of first and second coded picture data and/or pictures and/or slices of the coded output video stream V2 corresponds to the used coding modes in each case of the coded input video streams V11 and V12. Since the sequence of the coded pictures/slices of the two coded input video streams is identical, the signaling parameter "frame_num" differs only in an offset, this signaling parameter "frame_num" being initialized to 0 and incremented starting at 0 when a coded picture with a coding mode IDR is reached. The signaling parameters "frame_num" of the second slice headers SH21, SH22 can be generated from the start of a coded picture of coding mode IDR, see column XX, by copying the corresponding signaling parameter from one of the first slice headers SH11 and SH12. Before the coded picture with coding mode IDR is reached, the signaling parameter is obtained by deducting an offset from one of the signaling parameters "frame_num" of one of the first slice headers of SH11 or SH12, e.g. frame_num(SH21)=frame_num(SH12)−4.

The signaling parameter "pic_order_cnt_lsb" of the second slice headers SH21, SH22 is generated by a signaling parameter "pic_order_cnt_lsb", corresponding in time, of one of the first slice headers, e.g. SH12, being reduced by an offset, so that the signaling parameter "pic_order_cnt_lsb" of the second slice header begins with a minimum value 1. In this example:
"pic_order_cnt_lsb(SH21)"="(pic_order_cnt_lsb(SH12)−8) mod 15",
where the counter "pic_order_cnt_lsb" is limited to a value range from 0 to 15 by modular arithmetic (mod).

FIG. 6 shows first pictures P11_1, P11_2, P12_1, P12_2 of the coded input video streams. At first these are present separately in the appropriate coded input video streams V11, V12 in coded form, i.e. as first coded picture data B11, B12. What is achieved by applying the exemplary embodiment according to FIGS. 2 to 4 is that from the two individual first pictures P11_1 and P12_1, i.e. a picture pair, a single second picture P21 is generated, in such a way that when this is decoded and shown on an output medium it is reproduced in such a way that in the top half of the picture a picture content of the first picture P11_1 can be seen, and in the bottom half of the picture a picture content of the first picture P12_1 can be seen.

The exemplary embodiments of this description are mostly restricted to generating the coded output video stream while taking account of a single picture pair of first pictures, e.g. P11_1 and P12_1, into the single second picture P2_1. It is easily understood that the exemplary embodiments can be applied to a sequence of first pictures, the method steps which are stated in the exemplary embodiments being carried out in picture pairs, so that multiple first pictures of the coded input video streams can be transformed into multiple second pictures of the coded output video stream. In FIG. 6, the second picture P2_1 has been generated from the first pictures P11_1, P12_1, and a second picture P2_2 has been generated from the first pictures P11_2, P12_2. It is also easily understood that more than two coded input video streams can be used to establish the coded output video stream.

In a further exemplary embodiment using the H.264 video coding standard, slice group elements are used as coded sub-picture data TB1, TB2. Slice group elements make a flexible arrangement of slices possible, or, if a coded picture is represented by a single slice, flexible assignment of pictures, so that first pictures of the coded input video streams can be arranged next to each other in the second picture of the coded output video stream. The addresses of the macroblocks are also adapted, similarly to the exemplary embodiment according to FIG. 2. To generate the second signaling data S2 of the coded output video stream, the procedure can be similar to what is explained for the above exemplary embodiments. Exemplary embodiments of the second sequence parameter set SPS2 can be taken from FIGS. 7A, 7B, and of the second picture parameter set PPS2 from FIGS. 8A and 8B. The following differences must be noted:

In the second sequence parameter set SPS2, which is to be newly established, it must be noted that because of a different arrangement of the first pictures from the above examples, in the second picture a picture size indication of the second picture is determined differently. For example, if it is assumed that the first pictures each have 11×9 macroblocks as the picture size, and if the two first pictures are joined horizontally into the second picture, a picture size of the second picture of 22×9 macroblocks is determined. The resulting signaling parameters of the second sequence parameter set are
pic_width_in_mbs_minus1=22−1=21, and
pic_height_in_map_units_minus1=9−1=8.

In the second picture parameter set PPS2, which is to be newly determined, first a signaling parameter "num_slice_groups_minus1" must be set to 1, to signal that two slice groups are present in the coded output video stream to be established. Also, a signaling parameter "slice_group_map_type" must be set, e.g. "slice_group_map_type"=2. The further signaling parameters of the second picture parameter set PPS2 and second sequence parameter set SPS2 are executed similarly to the explanations of the above examples.

FIG. 9 shows, for the last exemplary embodiment, how the first pictures P11_1 and P12_1 are combined into a second picture P2_1. The first pictures have been inserted into the second picture horizontally next to each other. Similarly to the explanations of FIG. 6, further first pictures P11_2, P11_2 can be combined into a new second picture P2_2 by the procedure stated in the exemplary embodiment.

If a macroblock arrangement method, also called Flexible Macroblock Ordering (FMO), which is defined in the H.264 video coding standard is used, an assignment of the individual macroblocks to the slice groups in the coded output video stream is signaled. As well as some predefined types, completely free assignment is possible. This assignment is signaled by a table, the so-called "macroblock to slice group map", in which the appropriate "slice group" index is assigned for all macroblocks of a picture.

Figure 10:
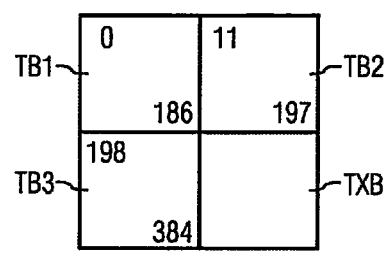
FIG. 10 is a graphical representation of an arrangement of multiple coded sub-picture data using the "slice group mode"

Of the predefined types in the H.264 video coding standard, among others a type=2, which allows a definition of rectangular slice groups, is very interesting. In this case the slice groups are defined by addresses of the top left and bottom right macroblocks of the slice groups. Finally, all macroblocks which are not captured in this way are assigned to the last slice group, a so-called background slice group. An example of such a configuration according to type=2 is shown in FIG. 10, on the basis of a picture size in CIF (Common Intermediate Format) format, i.e. with 352×288 pixels, of the second picture. If 16×16 pixels are combined into a macroblock in each case, the second picture, of CIF size, with a slice group size of 11×9 macroblocks, can have 2×2=4 slice groups. The macroblock addresses are assigned line by line, from top to bottom, starting with an index 0. Thus a first slice group TB1, i.e. the coded sub-picture data TB1, is characterized by the macroblock addresses 0 at top left and 186 at bottom right, a second slice group TB2, i.e. the coded sub-picture data TB2, is characterized by the macroblock addresses 11 at top left and 197 at bottom right, and a third slice group TB3, i.e. the coded sub-picture data TB3, is characterized by the macroblock addresses 198 at top left and 384 at bottom right. All uncaptured macroblocks are assigned to a last slice group TXB, i.e. to the bottom right picture square. Thus for each coded picture, i.e. first coded picture data, of the coded input video streams, a slice group TB1, TB3 can be assigned. Also, using slice groups, a vertical arrangement of first pictures can be made possible. In the H.264 video coding standard, up to eight slice groups are possible.

Figure 11:
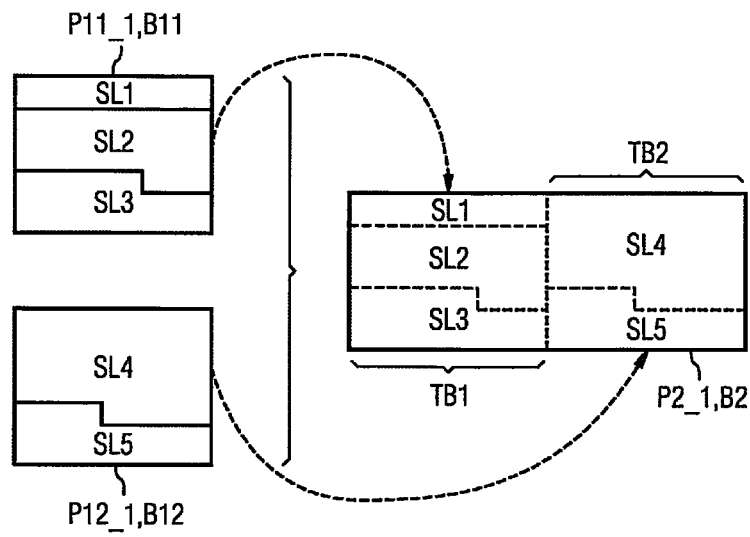
FIG. 11 is a graphical representation of an arrangement with combined use of "slice mode" and "slice group mode" to represent multiple slices per slice group.

If multiple slices SL1, SL5 are present in each of the first coded picture data, according to the H.264 video coding standard they can be inserted into an appropriate slice group TB1, TB2 corresponding to the arrangement in the appropriate first picture P11_1, P12_1. This can be seen in an example in FIG. 11, where the slice group TB1 of the second picture P2_1 includes the three slices SL1, SL2, SL3, and the slice group TB2 includes the two slices SL4, SL5. The macroblock addresses belonging to the slices in the slice groups must be adapted in the appropriate slice headers for the slices SL4 and SL5. In contrast, the addresses of the macroblocks of the slices SL1, . . . , SL3, which are held in the first slice group TB1, the addresses being held in the slice headers belonging to the slices SL1, SL3, can be copied directly from the first signaling data of the coded input video stream V11.

Figure 12:
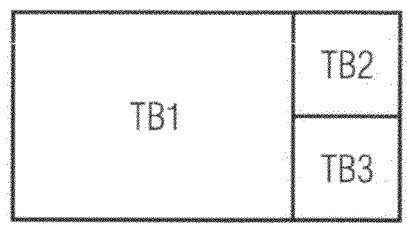
FIG. 12 is a graphical representation of a further arrangement with first pictures of different sizes and represented by the coded sub-picture data.

In FIG. 10, first coded picture data of three coded input video streams is inserted into a slice group TB1, RB2, TB3, the first pictures represented by the first coded picture data each having a picture size of QCIF. However, the H.264 video coding method also permits the coded sub-picture data, i.e. the slice groups TB1, TB2, TB3, to have different picture sizes. An exemplary arrangement for this is shown in FIG. 12, the coded sub-picture data TB1 representing a first picture with a picture size CIF, and the coded sub-picture data TB2, TB3 representing a coded first picture with a size QCIF.

The use of slices and slice groups as coded sub-picture data can also be applied in combination. For example, the intention is to transform nine first pictures or coded picture data of nine different coded input video streams into the second coded picture data of the coded output video stream. For this purpose, the new first coded picture data is copied into a slice of the second coded picture data. In each case, three of the slices of the second coded picture data are combined into one slice group. If the slices of a slice group are arranged one beneath the other, and the three slice groups are arranged next to each other, the result is a second picture of 3×3 first pictures. Thus with this procedure, a large number of coded input video streams can be transformed into the coded output video stream.

Figure 13:
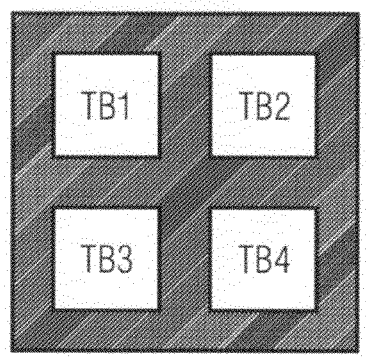
FIG. 13 is a graphical representation of a further arrangement of first pictures represented by the coded sub-picture data.

In an extension of the versions according to FIG. 10, it is possible that the individual slice groups TB1, TB2 and TB3 in the second picture do not touch each other directly, and/or their edges do not necessarily have to correspond to an edge of the second picture. The first pictures, or the first coded picture data, in the slice groups TB1 to TB4 are coded as so-called "foreground slice groups", and the macro blocks which are not indicated in this way are treated as the "background slice group". A width of the bars between the foreground slice groups is a multiple of a width of a macroblock, i.e. a multiple of 16 pixels. FIG. 13 shows a possible result on an output medium, after decoding the associated coded output video stream, the macro blocks which are not indicated being shown in black.

In addition to use of the method in the H.264 video coding method, the method can also be applied to other video coding standards which allow subdivision of the total picture, i.e. of the second coded picture data into separable coded sub-picture data. For example, in the H.263 video coding method, there is an optional coding mode for the use of slices (Rectangular Slice Submode, Annex K). However, flexibility is clearly restricted in comparison with H.264. The second picture can only be divided into rectangles with variable width, each rectangle being called a slice. However, the height of each of these slices corresponds to the height of the second picture. This means that in the H.263 standard, Annex K, the slices corresponding to the first pictures can only be arranged next to each other in the second picture. The procedure here is similar to the adaptation of the second signaling data from at least some of the first signaling data, e.g. in the picture header, as explained in the preceding exemplary embodiments. Furthermore, the GOB (Group of Block) headers are replaced by the slice headers, it being possible to copy most signaling parameters directly here. Then the first decoded picture data such as coefficients and movement vectors is copied directly at macroblock level, as second coded picture data. For this H.263 standard, Annex K too, transcoding of the coded picture information is unnecessary.

The method can also be applied to an SVC (Scalable Video Coding) video coding standard. However, for this purpose the layer structure, i.e. the structure of the local and SNR (Signal-to-Noise Ratio) layers, in the coded input video streams must be identical. Then, similarly to the case of H.264-coded input streams, the second sequence parameter set SPS2 can be acquired from the appropriate first sequence parameter sets SPS11, SPS12, and the second picture parameter set PPS2 can be acquired from the first picture parameter sets PPS11, PPS12, of the individual layers. Additionally, similarly to the above explanations for H.264, the slice headers are slightly adapted. The remaining slice data, i.e. the first coded picture data, includes, for example, coefficients and movement information, and is then copied, directly and unchanged, into the second coded picture data.

An interesting application of the method results if SVC-coded input video streams are used. The H.264-compatible base layers can be extracted from them, so that H.264-compatible coded input video streams are obtained. These are then transformed into the coded output video stream, similarly to the above exemplary embodiments. Thus in a video conferencing system with different terminals, the SVC terminals, with one or more decoders, can obtain and process the SVC-compatible coded input video streams, whereas traditional H.264 terminals with only one decoder can obtain and decode the H.264-compatible coded output video stream, formed from the H.264-compatible base layers.

A further advantageous embodiment relates to control of a data rate of the coded output video stream. For example, a bandwidth of a transmission channel is limited to one or more terminals. Since a total data rate of the coded output video stream is given in principle by a sum of the data rates of the individual coded input video streams, it is advantageous, for example, to regulate a data rate of the individually coded input video streams directly at the individual encoders of the terminals. In this way, resource-intensive transrating, i.e. reduction of the data rate while retaining the video coding standard and the temporal and spatial resolution, when the coded output video stream is generated from the coded input video streams is avoided. Thus in the case of a video conference, a central unit, i.e. a video conference control unit (MCU), can determine available bandwidths of the individual transmission channels for the relevant terminals, and derive the data rates of the individual decoders from them. This can happen both statically when the connection is set up, and dynamically during the video conference, if bandwidths of one or more transmission channels change over time, or new terminals are added to the video conference. A sum of the data rates of the individual coded input video streams must not be greater than the available bandwidth for any of the terminals.

When the first coded picture data B11, B12 is grouped into the second coded picture data B2, at first there are no restrictions. However, it can happen that in the case of INTER coding, i.e. applications of a prediction, a prediction takes place partly outside a picture area of the first picture described by the first coded picture data. For these pixels outside the picture area, the video coding method, e.g. H.263 or H.264, provides a specific computational rule. However, after the first coded picture data is copied to the second coded picture data, if a reference for the prediction, which in the case of the first coded picture data was outside the first pictures, is no longer outside the second picture which is described by the second coded picture data, in some circumstances a wrong prediction and thus wrong decoding are carried out. For this reason, it is advantageous, but not obligatory, to carry out predictions, in particular temporal predictions, when the coded input video streams are established, in such a way that they use exclusively predictions in which references point only within the appropriate picture area of a first picture. Otherwise, picture disturbances can occur on decoding in the area between the coded sub-picture data. However, these disturbances disappear after INTRA-coded pictures IDR, which in many application cases of video coding methods are sent at periodic time intervals. In the case of video conferencing applications with a static, immobile background, this problem can be ignored, since a prediction outside the picture area does not usually occur. When the coded output video stream is established, to ensure that the coded input video streams have no references based on the prediction outside the relevant picture area, this property can be signaled in the appropriate coded input video streams. For example, the H.264 standard provides so-called SEI (Supplemental Enhancement Information) messages for such signaling. The syntax and semantics of such an SEI message could look like this:
mixing_info (payloadSize) {constraint_inter_pred_flag}, where the signaling parameter constraint_inter_pred_flag=1 indicates that in INTER coding, predictions, in the case of temporal predictions, permit only references within the borders of the current picture.

Figure 14:
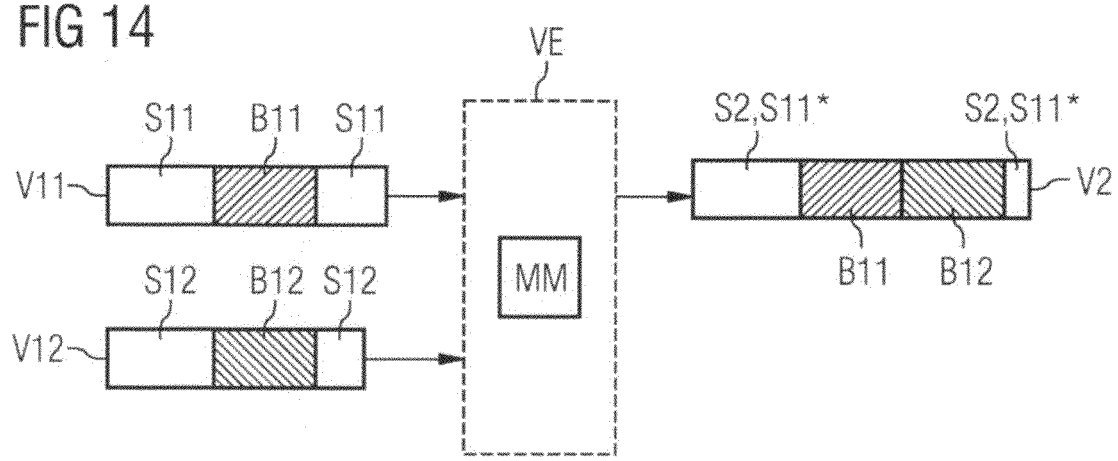
FIG. 14 is a block diagram of a schematic arrangement of a further exemplary embodiment.

A further exemplary embodiment is explained in more detail on the basis of FIG. 14. Similarly to FIG. 2, the coded input video streams V11, V12 each include the first coded picture data B11, B12 and the first signaling data S11, S12. To establish the second coded picture data B2, the first coded picture data is copied in succession into the second coded picture data B2. Additionally, almost all signaling parameters of the first signaling data S11 of one of the coded input video streams V11 can be taken over directly as the second signaling data S2. Only those signaling parameters of the second signaling data S2 which depend on a number of second coded picture data, e.g. a picture size of the second picture which is represented by the second coded picture data, or of position data within the coded output video stream, must be adapted.

The individual steps of the method are executed using means MM of a device V, VE. The means can be implemented and executed in software, hardware or a combination of software and hardware. The device can be used in a video conferencing control unit. Another application field is a video distribution service unit, e.g. a video server, which for example, by streaming, transforms and then transmits coded video contents of multiple coded input video streams into the coded output video stream, e.g. in the context of a video preview, to one or more terminals.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A method for establishing a coded output video stream from at least two coded input video streams, for joint representation of a first picture of each of the coded input video streams in a second picture of the coded output video stream, the coded output video stream and the coded input video streams having an identical color format, an identical bit resolution per coded pixel and an identical picture scanning, and are coded using an identical video coding method that has at least one coding mode in which second coded picture data describing the second picture of the coded output video stream can be divided into separable coded sub-picture data, comprising:

receiving the coded input video streams, each including first coded picture data and first signaling data containing first signaling parameters providing first administrative information of the coded input video streams, the first coded picture data in each case having picture information coded for the first picture;

producing the coded output video stream, including the second coded picture data, second control data and second signaling data containing second signaling parameters providing second administrative information of the coded output video stream, the second coded picture data being produced by copying one portion of the first coded picture data of first pictures to be shown simultaneously into one of the coded sub-picture data of the second picture, and the second signaling data being generated at least partly based on the first signaling data;

analyzing corresponding first signaling parameters of appropriate coded input video streams for whether an identical parameter value is present; and assigning the identical parameter value to the second signaling parameter corresponding to analyzed first signaling parameters, when the corresponding first signaling parameters have the identical parameter value, thereby reducing an output data volume of the coded output video stream compared with a total data volume of the coded input video streams.

2. The method as claimed in claim 1, wherein the coded input video streams each have multiple first pictures, and further comprising establishing the coded output video stream by generating for each second picture, the second signaling data and second coded picture data from a picture pair of the coded input video streams, based on the first coded picture data and the first signaling data.

3. The method as claimed in claim 2, wherein for each second picture, the coded sub-picture data are arranged vertically with upper and lower coded sub-picture data and the second signaling parameters of the second signaling data are generated for the lower coded sub-picture data so that a first address of a top left macroblock of the lower coded sub-picture data is generated from a second address, which is higher by a value of one, of a bottom left macroblock of the upper coded sub-picture data.

4. The method as claimed in claim 3, further comprising:

analyzing, for each first picture, a first signaling parameter describing an offset of a quantization parameter in the first signaling data; and if at least two first signaling parameters are found to be different by said analyzing thereof, determining a difference value of the at least two first signaling parameters, inserting the difference value, as a further signaling parameter, into one of the second signaling parameters of the second signaling data, and assigning the further signaling parameter to coded sub-picture data in which addition of the analyzed signaling parameter into the first signaling data corresponds to the difference value of another of the first signaling parameters.

5. The method as claimed in claim 3, further comprising:

analyzing, in the first signaling data, maximum number signaling parameters, each describing a maximum number of reference pictures to be taken into account in the coded input stream;

selecting a highest signaling parameter from the maximum number signaling parameters; and inserting the highest signaling parameter into the second signaling data.

6. The method as claimed in claim 3, further comprising:

analyzing, in the first signaling data, an appropriate signaling parameter describing one of an explicit control and an implicit control of a deblocking filter; and inserting as the second signaling parameters, if both explicit and implicit control are indicated by said analyzing, explicit signaling into the second signaling data belonging to the coded sub-picture data.

7. The method as claimed in claim 6, further comprising selecting a first picture of the coded input video streams to establish the second coded picture data for the second picture, where the first coded picture data belonging to the first pictures is present in only one identical prediction mode selected from among INTER coding, INTRA coding and bidirectional coding.

8. The method as claimed in claim 7, wherein a video coding method used is a slice mode, and wherein said method further comprises assigning a slice to each of the coded sub-picture data according to the slice mode.

9. The method as claimed in claim 7, wherein a video coding method used is a slice group mode, and wherein said method further comprises assigning a slice group to each of the coded sub-picture data according to the slice group mode.

10. The method as claimed in claim 7, wherein one of ITU H.264, ITU H.263 and SVC standards is used as a video coding method.

11. The method as claimed in claim 10, wherein the video coding method used is a standard ITU H.264, in which a slice group mode is used to form the coded sub-picture data.

12. The method as claimed in claim 10, wherein the coded input video streams are generated by extraction of Base Layer Information from SVC-coded input streams.

13. The method as claimed in claim 12, wherein the coded input video streams are generated from SVC-coded input streams based on Base Layer Information and at least one item of Enhancement Layer Information, where the Base and Enhancement Layer Information having an identical structure with respect to local and Signal-to-Noise Ratio layers.

14. The method as claimed in claim 1, further comprising establishing the coded output video stream using at least one of the coded input video streams, each of which have a prediction signaling parameter indicating that a prediction for coding the first picture exclusively within a picture border of the first picture has been carried out.

15. The method as claimed in claim 14, wherein the prediction signaling parameter is generated as follows, using an SEI message according to video coding standard H.264:

mixing_info (payloadSize) {constraint_inter_pred_flag} where the "payloadSize" field describes a size of the SEI message, and a specifiable value of the "constraint_inter_pred_flag" field indicates that a prediction for coding the first picture exclusively within the picture border of the first picture has been carried out.

16. The method as claimed in claim 1, wherein the administrative information includes at least one of picture size, picture number and quantization parameters.

17. A device for establishing a coded output video stream from at least two coded input video streams, for joint representation of a first picture of each of the coded input video streams in a second picture of the coded output video stream, the coded output video stream and the coded input video streams having an identical color format, an identical bit resolution per coded pixel and an identical picture scanning, and are coded using an identical video coding method that has at least one coding mode in which second coded picture data describing the second picture of the coded output video stream can be divided into separable coded sub-picture data, comprising:

means for receiving the coded input video streams, each including first coded picture data and first signaling data containing first signaling parameters providing first administrative information of the coded input video streams, the first coded picture data in each case having picture information coded for the first picture;

means for producing the coded output video stream, including the second coded picture data, second control data and second signaling data containing second signaling parameters providing second administrative information of the coded input video streams, the second coded picture data being produced by copying one portion of the first coded picture data of first pictures to be shown simultaneously into one of the coded sub-picture data of the second picture, and the second signaling data being generated at least partly based on the first signaling data;

means for analyzing corresponding first signaling parameters of appropriate coded input video streams for whether an identical parameter value is present, and means for assigning the identical parameter value to the second signaling parameter corresponding to analyzed first signaling parameters, when the corresponding first signaling parameters have the identical parameter value, thereby reducing an output data volume of the coded output video stream compared with a total data volume of the coded input video streams.

18. The device according to claim 17, wherein the device is in a video conference control unit connected to at least two terminals, and wherein the device further comprises an interface connecting said means for receiving and producing to the at least two terminals.

19. The device according to claim 17, wherein the administrative information includes at least one of picture size, picture number and quantization parameters.

20. At least one non-transitory computer readable medium storing instructions to encode at least two coded input video streams, each including first coded picture data, and first signaling data containing first signaling parameters providing first administrative information of the coded input video streams, including a signaling parameter indicating a prediction for coding a first picture exclusively within a picture border of the first picture, the first coded picture data in each case having picture information coded for the first picture, used for establishing a coded output video stream from the at least two coded input video streams, for joint representation of a first picture of each of the coded input video streams in a second picture of the coded output video stream, the coded output video stream and the coded input video streams having an identical color format, an identical bit resolution per coded pixel and an identical picture scanning, and are coded using an identical video coding method that has at least one coding mode in which second coded picture data describing the second picture of the coded output video stream can be divided into separable coded sub-picture data, said instructions causing at least one processor to execute a method comprising:

producing the second coded picture data by copying one portion of the first coded picture data of first pictures to be shown simultaneously into one of the coded sub-picture data of the second picture, and second signaling data containing second signaling parameters providing second administrative information of the coded input video streams generated at least partly based on the first signaling data;

analyzing corresponding first signaling parameters of appropriate coded input video streams for whether an identical parameter value is present; and assigning the identical parameter value to the second signaling parameter corresponding to analyzed first signaling parameters, when the corresponding first signaling parameters have the identical parameter value, thereby reducing an output data volume of the coded output video stream compared with a total data volume of the coded input video streams.

\* \* \* \* \*